(12) United States Patent
Pöhlking et al.

(10) Patent No.: US 11,627,698 B2
(45) Date of Patent: Apr. 18, 2023

(54) SEPARATING DEVICE

(71) Applicant: Grimme Landmaschinenfabrik GmbH & Co. KG, Damme (DE)

(72) Inventors: Alfons Pöhlking, Steinfeld (DE); Franz-Josef Dettmer, Ankum (DE)

(73) Assignee: Grimme Landmaschinenfabrik GmbH & Co. KG

( * ) Notice: Subject to any disclaimer, the term of this patent is extended or adjusted under 35 U.S.C. 154(b) by 279 days.

(21) Appl. No.: 16/760,927

(22) PCT Filed: Oct. 26, 2018

(86) PCT No.: PCT/EP2018/079493
§ 371 (c)(1),
(2) Date: May 1, 2020

(87) PCT Pub. No.: WO2019/086354
PCT Pub. Date: May 9, 2019

(65) Prior Publication Data
US 2021/0168995 A1 Jun. 10, 2021

(30) Foreign Application Priority Data
Nov. 1, 2017 (DE) .......................... 102017125561

(51) Int. Cl.
*A01D 33/08* (2006.01)
*B07B 4/08* (2006.01)
(Continued)

(52) U.S. Cl.
CPC ................ *A01D 33/08* (2013.01); *B07B 4/08* (2013.01); *B07B 11/06* (2013.01); *B65G 15/52* (2013.01); *B65G 21/20* (2013.01)

(58) Field of Classification Search
CPC ........... A01D 33/08; B07B 4/08; B07B 11/06; B65G 15/52; B65G 21/20; A01F 12/48
(Continued)

(56) References Cited

U.S. PATENT DOCUMENTS 3,227,276 A * 1/1966 Leighton ................ A01D 33/08
209/139.1
3,429,438 A * 2/1969 Strandlund ............ A01D 33/08
209/147
(Continued)

FOREIGN PATENT DOCUMENTS

CN 105123081 A 12/2015
CN 105123081 A * 12/2015 ............. A01D 33/02
(Continued)

*Primary Examiner* — Gene O Crawford
*Assistant Examiner* — Muhammad Awais
(74) *Attorney, Agent, or Firm* — Husch Blackwell LLP

(57) ABSTRACT

A separating device is provided for separating a harvested mixture of root crops and admixtures. The separating device includes at least one conveyor element which circulates in operation at least for supplying the harvested mixture to a separation region, or for discharging the root crops from the separation region in a conveying direction. The separating device includes at least one fluid flow generator and at least one directing device for directing a fluid flow in a fluid flow direction to the separation region. The directing device is at least realized in at least one directing portion by the conveyor element itself.

13 Claims, 6 Drawing Sheets

(51) Int. Cl.
*B07B 11/06* (2006.01)
*B65G 15/52* (2006.01)
*B65G 21/20* (2006.01)

(58) Field of Classification Search
USPC .......................................................... 209/470
See application file for complete search history.

(56) References Cited

U.S. PATENT DOCUMENTS

| | | | | | |
|---|---|---|---|---|---|
| 3,921,809 | A | * | 11/1975 | Smith | B07B 4/08 |
| | | | | | 209/675 |
| 4,515,276 | A | * | 5/1985 | Feller | A01D 33/04 |
| | | | | | 209/932 |
| 5,213,219 | A | * | 5/1993 | Griffin | A01D 17/10 |
| | | | | | 209/665 |
| 2010/0000194 | A1 | * | 1/2010 | Meester | A01D 45/006 |
| | | | | | 56/327.1 |
| 2010/0291980 | A1 | * | 11/2010 | Ricketts | B07B 4/08 |
| | | | | | 460/26 |
| 2015/0321226 | A1 | * | 11/2015 | Dettmer | A01D 33/02 |
| | | | | | 209/29 |

FOREIGN PATENT DOCUMENTS

| | | | |
|---|---|---|---|
| DE | 908808 C | | 4/1954 |
| DE | 908808 C | * | 4/1954 |
| DE | 928017 | * | 4/1955 |
| DE | 928017 | * | 5/1955 |
| DE | 928017 C | | 5/1955 |
| DE | 206884 A3 | * | 2/1984 |
| DE | 206884 A3 | | 2/1984 |
| EP | 0212151 A1 | * | 6/1986 |
| EP | 0212151 A1 | * | 3/1987 |
| EP | 0212151 A1 | | 3/1987 |

* cited by examiner

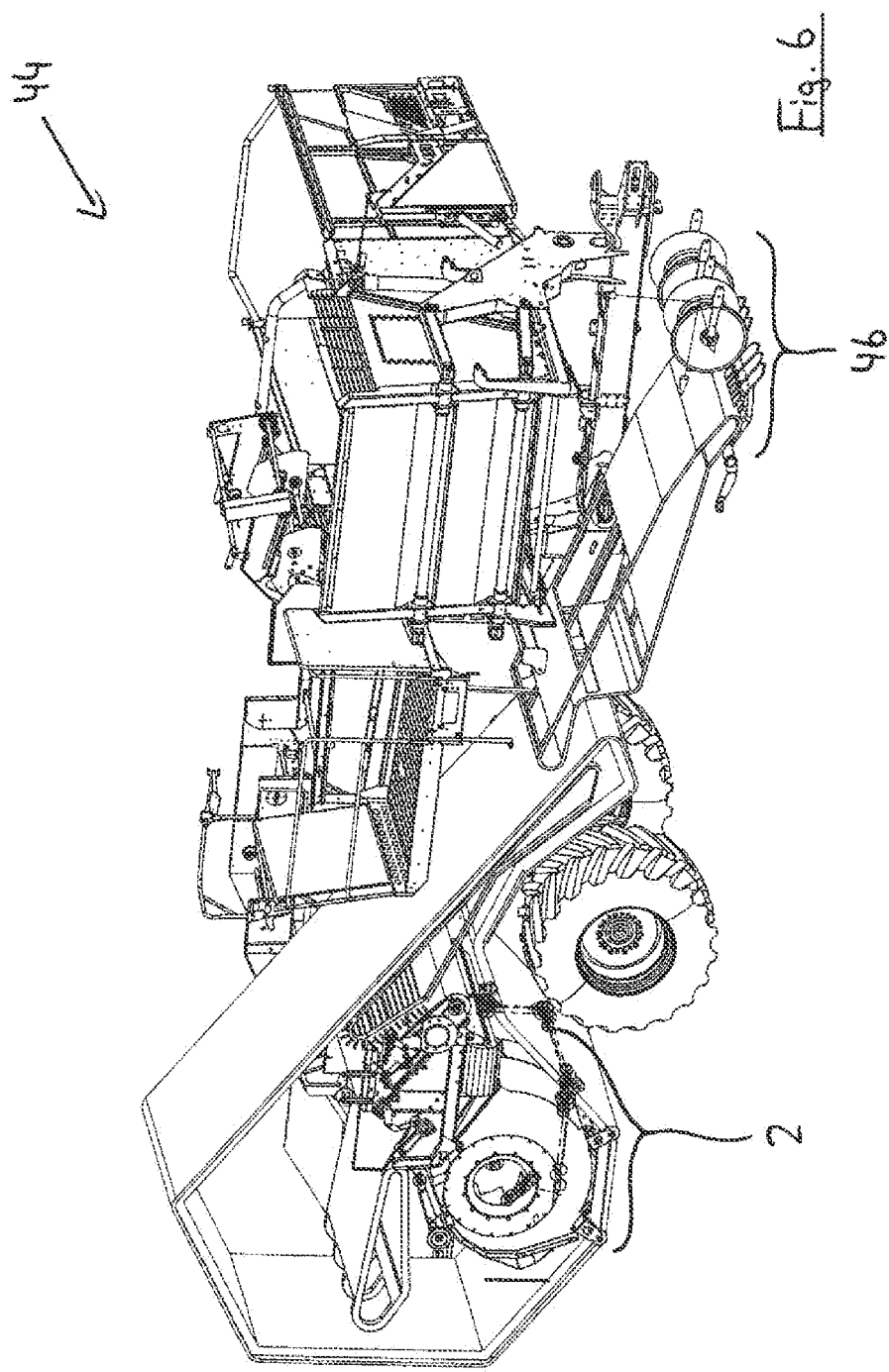

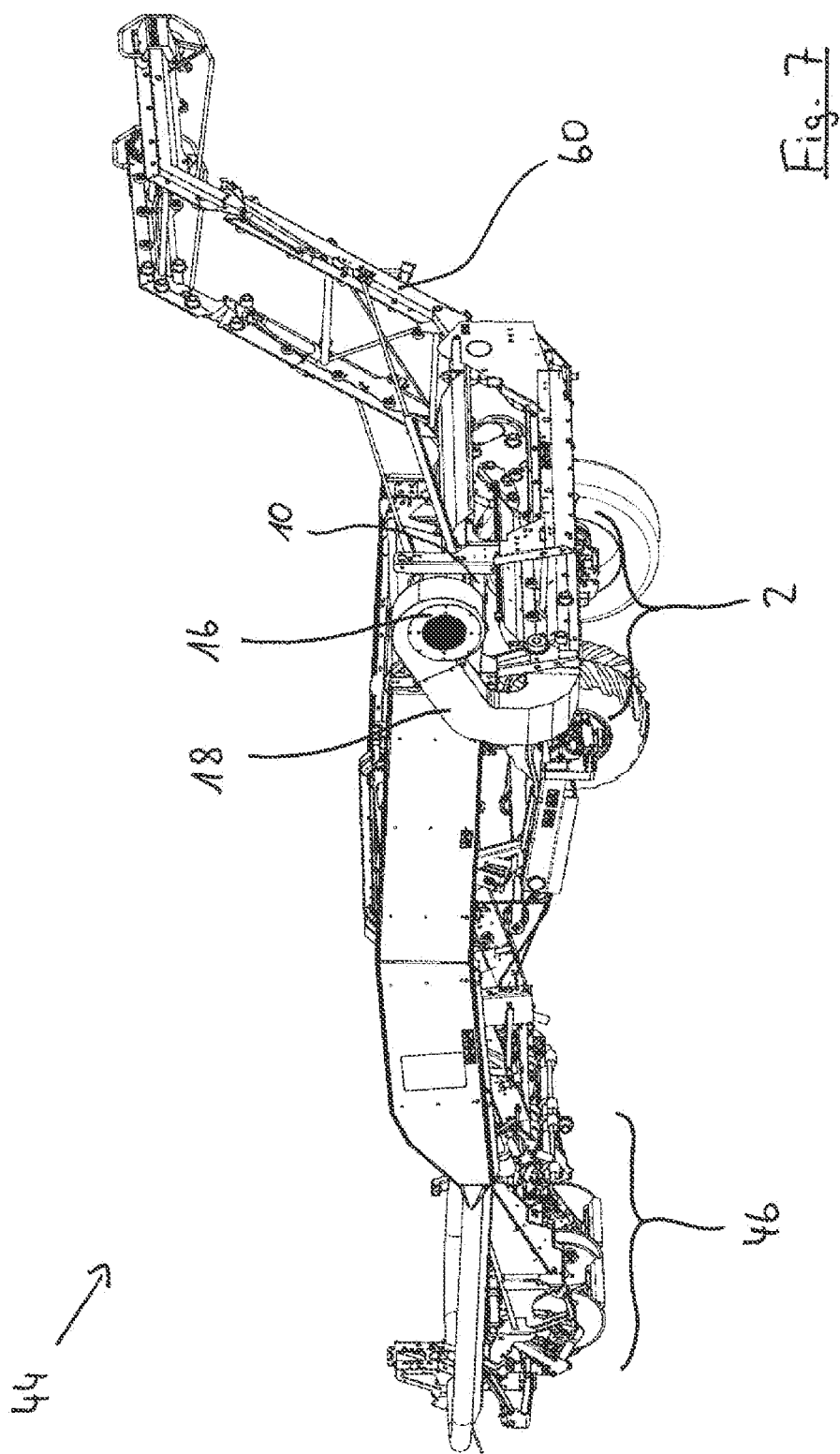

SEPARATING DEVICE

CROSS REFERENCE

This application claims priority to PCT Application No. PCT/EP2018/079493, filed Oct. 26, 2018, which itself claims priority to German Application No. 10 2017 125561.3, filed Nov. 1, 2017, the entirety of both of which are hereby incorporated by reference.

FIELD OF THE INVENTION

The invention relates to a separating device for separating a harvested mixture of root crops and admixtures. The separating device includes at least one conveyor element which circulates in operation and serves at least for supplying the harvested mixture to a separation region or for discharging the root crops from the separation region. The conveyor element, in this case, conveys in a conveying direction. In addition, the separating device includes at least one fluid flow generator and at least one directing device for directing a fluid flow in a fluid flow direction to the separation region.

Both the fluid flow and the harvested mixture are directed through the separation region in operation. In this case, root crops and admixtures, such as, for example, sand, weeds or stones, are separated from one another under the influence of the fluid flow. The density of the admixtures which deviates from that of the root crops is utilized for this purpose, as a result of which the fluid flow generates a different force effect on the admixtures than on the root crops. To this end, the fluid flow is directed by the directing device from the fluid flow generator to the separation region in which the fluid flow acts on the harvested mixture.

BACKGROUND

Such a separating device for a potato harvesting machine is disclosed, for example, in DE 10 2014 006 842 A1. In this case, the crop is moved by a screening belt into the region of a drop step in which an air flow acts on the crop. In said separation region the crop is situated temporarily on a retaining element, from which the potatoes are forwarded in a first direction and the stones are conveyed away in an opposite direction. As an alternative to this or in addition to it, loose weed constituents of the harvested mixture can be blown off by the air flow in the separation region.

According to the prior art, the air flow is directed through an air channel up to the region of the drop step by means of the directing device. The air channel has a wall with an outer surface which is arranged in the region of the screening belt to be conveyed. The end of said surface facing the separation region has a slight gradient relative to the supporting surface of the harvesting machine. In operation, particles such as grains of sand and clods of earth are consequently deposited on the surface and, once they have built up to a certain extent on the surface, impair the operation of adjoining, in particular circulating, components of the separating device.

BRIEF SUMMARY

It is the object of the present invention to provide a separating device and a machine including the separating device where the depositing of admixtures is prevented.

The object is achieved according to the invention by a separating device of the type designated previously, the directing device being at least realized in at least one directing portion by the conveyor element itself.

The fluid flow is consequently directed in operation along the directing portion in portions between the fluid flow generator and the separation region. The directing device is consequently realized in part by the conveyor element which circulates in operation and conveys the harvested mixture or the root crops. When the separating device is operating, the conveyor element consequently has, on the one hand, contact with the harvested mixture or with the root crops and, on the other hand, contact with the fluid flow before it reaches the separation region. The conveyor element therefore fulfils two functions at the same time.

The fluid acting on the crop is preferably air or an air-gas mixture. The fluid flow, in this case, is generated by a blower which is arranged, in particular, below the separation region in a harvesting machine with the conveying device according to the invention. By an air flow flowing in part along the conveyor element, dirt which has been deposited on the conveyor element, is dried or blown off.

The conveyor element is preferably of a one-part, or as an alternative to this, of a multi-part design. The directing device is at least realized in the at least one directing portion in particular by a plurality of conveyor elements themselves. The directing portion is preferably realized by only one conveyor element itself. In addition, the directing portion preferably has a linear extension in a direction orthogonal to the fluid flow direction and in a particularly preferred manner is level at least in portions. The fluid flow direction is the direction in which the fluid flow is directed by the directing device. In particular, the fluid flow direction is directed to the separation region.

The directing device and consequently the directing portion direct the fluid whilst said fluid flows from the fluid flow generator to the separation region. The directing device is preferably realized as a housing which is rigid at least in portions and surrounds, among other things, the fluid flow generator. Between the fluid flow generator and the separation region, the directing device surrounds the fluid flow from at least four housing sides, which are arranged in a preferred manner at right angles to one another and extend in the conveying direction. In this case, the conveying element replaces at least in part one housing side or wall of the directing device.

In a preferred manner, the directing device extends up to the separation region. As an alternative to this, the fluid flow is directed by the directing device between the fluid flow generator and the separation region only along a part portion.

The conveying element is realized, in particular, as a rotating roller or circulating belt. The conveying element conveys either the crop mixture in the direction of the separation region or the root crops once they have left the separation region. As an alternative to this, the conveyor element runs through the separation region. In an advantageous design of the invention, the conveyor element directly adjoins the separation region, as an alternative to this at least one further component of the conveying device is arranged between the conveyor element and the separation region in the conveying direction of the harvested mixture or of the root crops.

A drop step for the harvested mixture is preferably realized in the separation region which at least the root crops drop down. The fluid flow, in this case, acts at least during the drop, in particular also once the drop has been completed, on the root crops or the admixtures. In particular, at least the root crops drop onto a riddle grate which comprises recesses, through which at least part of the fluid flow passes and thus acts from below on the root crops or the admixtures. The fluid flow and the harvested mixture preferably intersect in the separation region. In a particularly preferred manner, the riddle grate carries out a riddling movement in operation in order, on the one hand, to promote the separating action by the fluid flow and, on the other hand, to impart pulses to the root crops for forwarding them out of the separation region.

In said configuration, in the conveying direction upstream of the riddle grate, which has an, in particular, slight incline in the conveying direction, are arranged multiple movable separating elements which allow the admixtures with a higher density than the root crops, such as stones, to pass through and do not allow the root crops themselves to pass through. The stones, after passing the separation elements, move, induced by the force of gravity, onto a baffle plate which directs the stones, at least proportionately, in opposition to the conveying direction to a stone removal device, which is realized, in particular, as a conveyor belt, which runs at least in part in a horizontal manner and extends transversely to the conveying direction. As a result, the root crops and at least part of the admixtures leave the separation region in different directions.

In said configuration, the fluid flow passes, on the one hand, through recesses in the riddle grate and, on the other hand, through the separating elements. In the directing device, before reaching the separation region, the fluid flow divides into a part flow which passes directly through the riddle grate and a further part flow which initially passes through the baffle plate and then through the separating elements or between said separating elements. The fluid flow consequently acts on the harvested mixture in the separation region by means of the separating elements and the riddle grate. In order to be able to remove the admixtures by means of the removal device, lateral parts of the directing device, which extend parallel to the conveying direction, are not closed in a fluid-tight manner. The separating device is nevertheless able to be realized in a sufficiently compact manner as a result of the design according to the invention.

In an alternative embodiment of the separating device according to the invention, the harvested mixture passes into the separation region in a first conveying direction and the root crops leave the separation region in a further conveying direction which deviates from the first conveying direction. The further conveying direction, in this case, is in particular arranged orthogonally to the first conveying direction. As a result, and through the realization according to the invention, the conveying device can be integrated in a particularly simple and compact manner in existing overload steps of harvesting machines.

The conveying device according to the invention is suitable for use in various machines. In this case, it serves, in particular, for separating root crops, such as potatoes or turnips, from admixtures. It serves for use both in harvesting machines and in loading or sorting machines which are operated both in a mobile manner, i.e. at various sites or in various fields, and in a stationary manner.

An advantage of the design according to the invention of the separating device is additionally that by realizing part of the directing device by the conveyor element instead of by a stationary directing element, the contamination of the directing portion is limited. In particular, as a result of parts of the directing device with surfaces which are remote from a ground surface and only have slight gradients, being able to be replaced by the conveyor element, a permanent depositing of particles, such as grains of sand and clods of earth, on the surfaces is effectively prevented. As a result of deposits not being built up by the particles, possible components of the separating device adjoining the directing device are no longer impaired by deposits and consequently the reliability of the separating device is increased. As a result of utilizing the conveyor element for two functions, on the one hand for the conveying of the harvested mixture or the root crops and, on the other hand, for the directing of the fluid flow, material can additionally be saved and a higher degree of efficiency of the separating device can be realized. The separating device is also compact upward.

The directing portion preferably extends up to the separation region. The conveyor element also consequently borders directly on the separation region in its conveying direction. The harvested mixture transfers directly from the conveyor element into the separation region or the other way around. In this way, the directing portion can be realized in a particularly economical manner by the conveyor element and allows for the realization of a particularly large directing portion by the conveyor element.

In a preferred manner, the directing portion, in this case, directly adjoins the separation region. As an alternative to this, there is a gap, in which, for example, a cross strut of the directing device is arranged, between the directing portion and the separation region. Said gap has, however, a smaller extension in the fluid flow direction than the direction portion in the fluid flow direction. As a result of said extension of the directing portion, particle depositing in particular in the part of the directing device adjoining the separation region is avoided in a particularly effective manner. As a result, the reliability of, in particular, the conveyor element or of other components of the separating device directly adjoining the separation region is not restricted by particle build-up on the directing device.

In a preferred manner, the conveyor element is realized as a substantially fluid-impermeable conveyor belt. No more than 10% of the fluid flow passes through the conveyor element in the region of the directing portion. The advantage here is that the fluid flow generated by the fluid flow generator is able to be utilized as largely as possible in the separation region and that air emerging in the directing portion does not cause any wear outside the directing device. As a result of the realization of the conveyor element as a conveyor belt, the directing portion can be realized formed in a particularly simple and advantageous manner. The conveyor belt is preferably realized in one part or by a plurality of conveyor belt parts. As a result of utilizing the conveyor belt as a conveyor element, the form of the directing device that is optimum for the fluid flow can also be realized in a simple manner in the region of the directing portion. In addition, the extent of fluid flow losses in the region of the directing portion can be kept particularly low by utilizing the air-impermeable conveyor belt.

In particular, the side of the conveyor belt on which the harvested mixture or the root crops rest during conveying forms the directing portion in such a manner that said side faces the fluid flow when realizing the directing portion. In a preferred manner, said side lies in an imaginary plane in portions in the region of the directing portion, as a result of which the directing device is able to direct the fluid flow in portions in a linear manner and along the shortest path from the fluid flow generator to the separation region.

In a particularly preferred manner, the conveyor belt is realized as a slat conveyor with a plurality of conveyor belt slats which abut against one another in the conveying direction. The conveyor belt slats have, in particular, the same width as the conveyor belt and adjoin one another in the circulating direction. They are, in this case, dimensionally stable and only deform insignificantly when the direction of the conveyor belt is deflected. They are produced in a preferred manner from a plastic material. Adjacent conveyor belt slats are connected together in a preferred manner by means of a tongue and groove arrangement. As a result, a gap between adjacent conveyor belt slats, through which, for instance, part of the fluid flow is able to pass, is effectively prevented. As an alternative to this, adjacent conveyor belt slats are connected together by means of at least one hinge. As a result of utilizing the conveyor belt slates, the directing portion is realized in a particularly dimensionally stable manner and the fluid flow has, in particular, a smaller influence on the form of the directing portion as a result of its pressure. From this follows, in addition, greater tightness and reliability of the directing device in the region of the directing portion.

As an alternative to this, the conveyor belt is realized as a belt loop. This is composed preferably in one piece or, as an alternative to this, of a plurality of belt loop parts. The advantage of the belt loop is maximum tightness on account of no gaps being present between the conveyor belt parts. In addition, a conveyor belt consisting of a belt loop can be deflected in a particularly flexible manner and consequently the conveyor belt has a plurality of form and guidance possibilities in the region of the directing portion.

In an advantageous design of the invention, the directing portion is realized by a conveyor side of the conveyor belt. In particular, the directing portion is realized by a portion of the conveyor side of the conveyor belt which delimits the fluid flow upward in a vertical direction. The conveyor side is the side of the conveyor belt on which the harvested mixture or the root crops rest in portions in operation and which is directed outward at least in portions. Said conveyor side realizes the directing device itself in the directing portion in one portion of the circulation of the conveyor belt in which no harvested mixture or root crops rest on the conveyor side. In a preferred manner, the directing portion delimits the fluid flow upward, that is to say the directing portion faces the ground in operation. As a result, the fluid flow can be guided along the separation region at an optimum angle, in particular obliquely upward. As a result of the conveyor side itself forming the directing device, the conveying device is able to be realized in a particularly space-saving manner. In this case, in particular the conveyor belt part on which the harvested mixture or the root crops rest is arranged adjacent to the conveyor belt part realizing the directing portion.

The conveyor element realizing the directing portion is preferably that which supplies the harvested mixture to the separation region. As a result, in particular where a drop step is present in the separation region, it is possible to guide the fluid flow enabling the fluid flow to contact the harvested mixture at least approximately at a right angle to the movement direction thereof. In a particularly preferred manner, as a result of realizing the directing portion with the conveyor element to be conveyed, the fluid flow can be directed such that the root crops in the separation region are blown on at least proportionally in the conveying direction, as a result of which the fluid flow is able to contribute to conveying the root crops out of the separation region.

In a preferred manner, the directing portion has a length of at least 20 cm, in particular of at least 40 cm, up to a maximum length of 3.50, in the fluid flow direction. The directing portion is realized by the conveyor element itself but not necessarily solely by the conveyor element. In particular, the directing device, on the side of the part of the conveyor element realizing the directing portion, said side facing the fluid flow, comprises stabilizing cross struts or, for instance, a grid which also realizes the directing portion and predetermines or stabilizes the directing device or the form of the directing portion. The minimum extension of the directing portion in the fluid flow direction prevents the depositing of dirt particles in a large region on the directing device.

In a particularly preferred manner, the directing portion has a width orthogonal to the fluid flow direction of at least 80%, in particular at least 90% of the width of the conveyor element. The conveyor element realizes the directing portion consequently with a largely predominant part of its width which is orthogonal to the direction of circulation of the conveyor element. As a result of said configuration, on the one hand the depositing of dirt particles on surfaces of the directing device can be effectively avoided and, on the other hand, the guiding of the fluid flow is designed in a particularly effective manner. In particular, the conveyor belt directly adjoins the directing device in the region of the directing portion in outer side regions and consequently prevents fluid passing between the conveyor element and the directing device at least largely. The width of the directing portion permits the realization of an effect of the fluid flow, which is largely homogeneous over that of the conveyor element, on the harvested mixture in the separation region and particularly extensive prevention of stationary parts on the guiding device which tend to build up a solid layer of dirt.

In an advantageous design of the invention, the directing portion comprises at least in part a gradient of no more than 60°, in particular of no more than 30°, relative to a horizontal. The horizontal, in the case of the use of the conveyor device in a harvesting machine, is a level supporting surface on which the harvesting machine stands. By the directing portion comprising at least in part a surface which has a gradient of between 0° and 60° or 0° and 30°, the fluid flow can be introduced into the separation region by the directing portion in a particularly flat manner and consequently in an advantageous manner for fluid-flow-induced conveying of the root crops. In this case, the gradient is measured in a longitudinal section parallel to the conveying direction of the crop mixture. Said flat part of the directing device, along which particles collect and dirt is built up in a particularly marked manner in the prior art, is consequently replaced by the conveyor element. Consequently, the form of the directing device has to be modified only insignificantly compared to the prior art and the fluid flow can contact the harvested mixture at an optimum angle.

The separating device preferably comprises at least one wiper lip which is stationary relative to the fluid flow generator and is arranged in a sealing manner on the conveyor element. Said wiper lip preferably delimits the directing portion in the fluid flow direction. The wiper lip abuts either directly against the conveyor element and strips it during the circulating of the conveyor element or is at a slight spacing from the conveyor element, as a result of which particles which have built up along the conveyor element are wiped off but no friction is generated along the conveyor element. The wiper lip is arranged in a particularly preferred manner orthogonally to the circulating direction of the conveyor element extending thereon and has, in particular, a width which corresponds to that of the conveyor element. In a preferred manner, the wiper lip is fastened to a cross carrier which is arranged together with the wiper lip between the directing portion and the separation region and is stationary with reference to the fluid flow generator. An advantage of the elastic or rigid wiper lip is the cleaning of the conveyor element that can be achieved with said wiper lip, in particular prior to running into the direction portion. As a result, the ingress of dirt or of admixtures adhering to the conveyor element into the directing device can be largely avoided and greater tightness in the bordering region between the conveying element and the directing device can be realized.

In a preferred manner, the separating device comprises at least one sealing lip which seals the directing portion toward a further part of the directing device and is arranged on the conveyor element in a stationary manner relative to the fluid flow generator. Said sealing lip is arranged, in particular, in the region of the rear end of the directing portion in the circulating direction of the conveyor element. In this case, it runs in a preferred manner orthogonally to the circulating direction of the conveyor element and in particular parallel to the wiper lip. The sealing lip is arranged either abutting against the conveyor element or at a small distance from the conveyor element thereon. In particular, the sealing lip has a width which corresponds at least to that of the directing portion and is arranged on the directing device or on a part thereof. The directing portion is sealed in said region by the sealing lip against leakage of the fluid flow from the directing device, as a result of which, a greater proportion of the fluid flow generated by the fluid flow generator reaches the separation region. The greater tightness increases the efficiency of the separating device.

In a particularly preferred manner, the separating device comprises at least one guide element which guides a conveyor belt portion which realizes the directing portion itself. The conveyor belt portion is a part thereof which is delimited from the rest of the conveyor belt in the circulating direction and has the same width as the conveyor belt. The guide element has contact with at least one surface of the conveyor belt portion and brings about reliable positioning of the same for optimum realization of the directing portion.

In an advantageous design of the invention, at least one of multiple guide elements is realized as a pressing roller which is arranged at least on the side of the conveyor belt portion remote from the fluid flow. The pressing roller rolls in operation along the inner surface of the conveyor belt and has a rotational axis which is, in particular, parallel to a drive axis of the conveyor element. The pressing roller prevents the conveyor element being lifted off the directing device as a result of the increased pressure therein and absorbs at least part of the force applied on the conveyor belt portion by the fluid flow. In a particularly preferred manner, the separating device comprises a plurality of pressing rollers which rest at least on lateral parts of the conveyor belt portion which adjoin the outer conveyor belt edge. In this case, the separating device comprises, in particular, multiple pressing rollers which are spaced apart from one another in the circulating direction of the conveyor element and, in particular, multiple pressing rollers which are spaced apart from one another in the direction of the rotational axis. As a result of the reliable positioning of the conveyor belt portion, particularly effective guiding of the fluid flow and improved tightness of the directing portion are ensured.

At least one of the multiple guide elements is preferably realized as a position roller which is arranged at least on the side of the conveyor belt portion facing the fluid flow. The position roller has a rotational axis which is parallel to that of the pressing roller and is arranged on the opposite side of the conveyor belt portion. In operation, the conveyor belt portion rolls along the position roller and is consequently positioned in a particularly reliable manner on the directing device with minimum energy losses. In a particularly preferred manner, the separating device has a plurality of position rollers which are spaced apart from one another at least in the circulating direction of the conveyor element or transversely thereto.

In an advantageous design of the invention, at least one of the multiple guide elements is realized as a sliding element which abuts at least against the side of the conveyor belt portion facing the fluid flow and extends in the fluid flow direction, in particular over the entire length of the conveyor belt portion. In operation, the conveyor element slides along the sliding element in the region of the directing portion, as a result of which, the conveyor belt portion is prevented from sagging. The conveyor belt portion rests on the directing element which has, in particular, a width of no more than 20% of that of the conveyor element and extends mainly in the fluid flow direction. As a result, the positioning of the conveyor element in the region of the directing portion is reliably ensured. The sliding element preferably extends between the sealing lip and the scraper lip and provides a mechanical connection between them there. Consequently, the mechanical stability of the directing device is increased. In a particularly preferred manner, the separating device has a plurality of sliding elements which are arranged parallel to one another and are spaced apart from one another transversely to the circulating direction of the conveyor element. In particular, the conveyor belt portion rests with lateral regions, which do not realize the directing portion themselves, on the at least one sliding element.

The object underlying the invention is additionally achieved by a machine for harvesting or overloading root crops which has a receiving device and a separating device according to the invention. The receiving device serves, in particular, for receiving root crops from the earth. The machine is realized, in particular, as a harvesting machine which serves for harvesting root crops such as potatoes or turnips directly out of the ground. Said machines, which are used on the field, have either a bunker which realizes a storage space for the root crops or are utilized as an overload harvesting machine which has no actual storage space of its own. As an alternative to this, the machine is realized as a sorting or transport system where the root crops are received from the receiving device, are separated from admixtures by the separating device and are then output to a site which deviates from the site of the receiving device. The separating device, in this case, is supported on the frame of the machine or also realizes the same itself.

BRIEF DESCRIPTION OF THE DRAWINGS

Further details and advantages of the invention can be found in the exemplary embodiments which are described below and are shown in a schematic manner. The Figures are as follows:

FIG. 6 shows an overview of the machine according to the invention according to FIG. 5.

FIG. 7 shows an overview of an alternative machine according to the invention.

DETAILED DESCRIPTION

The features explained below of the exemplary embodiments according to the invention can also be an object of the invention individually or in combinations other than those shown or described, always, however, at least in combination with the features of claim 1 or of claim 15. Insofar as is sensible, parts which produce the same effect functionally are provided with identical reference symbols.

Figure 1:
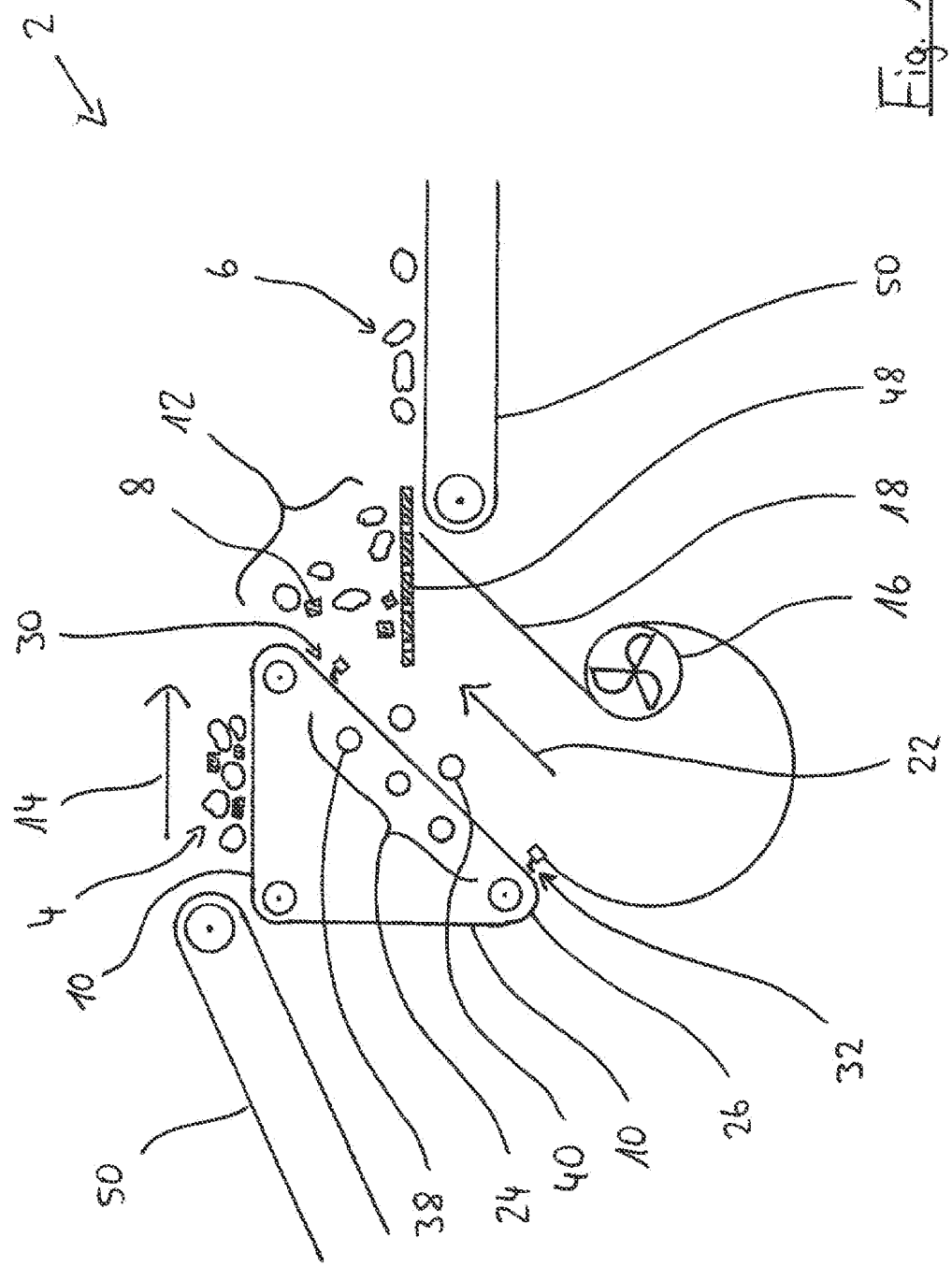
FIG. 1 shows schematic representation of a longitudinal section of a separating device according to the invention.

FIG. 1 shows a separating device 2 according to the invention for separating a harvested mixture 4 of roots crops 6 and admixtures 8. The conveying device 2 comprises a conveyor element 10 which is realized as a conveyor belt and supplies the harvested mixture 4 to a separation region 12. The harvested mixture 4, in this case, is moved in a conveying direction 14. In the separation region 12, the harvested mixture 4 drops down a drop step onto a riddle grid 48. In the separation region 12, in this case, a fluid flow, which flows in the fluid flow direction 22, acts on the harvested mixture 4.

The fluid flow is generated by a fluid flow generator 16 and is directed by a directing device 18 to the separation region 12. The directing device 18 is realized in a level directing portion 24 by the conveyor element 10 itself. The directing portion 24 is delimited, on the one hand, by a sealing lip 32 and is delimited, on the other hand, by a wiper lip 30. In the region of the directing portion 24, the conveyor element 10, which is realized as a conveyor belt, is guided by position rollers 40, which abut on the fluid flow side against the conveyor element 10, and pressing rollers 38 which abut on the opposite side of the conveyor element 10.

A first hedgehog web 50, by means of which the harvested mixture 4 is applied onto the conveyor element 10, from which it is forwarded in the conveying direction 14, is situated upstream of the conveying device 2. After passing the riddle grid 48, which comprises recesses through which part of the fluid flow flows in operation, the root crops 6 pass onto a further hedgehog web 50 which removes them from the separating device 2.

Figure 2:
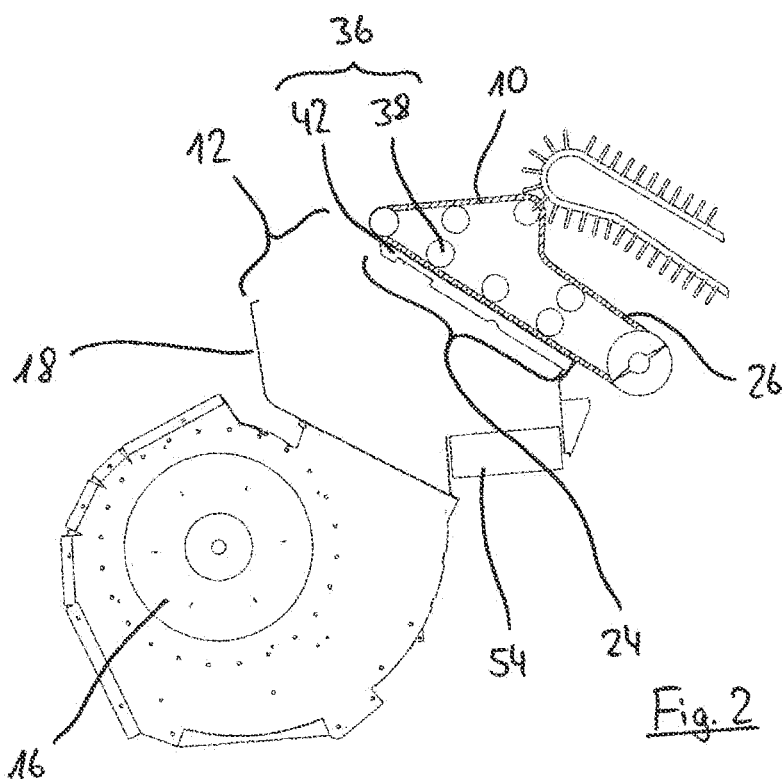
FIG. 2 shows a partly shown longitudinal section of a separating device according to the invention from an opposite perspective.
Figure 3:
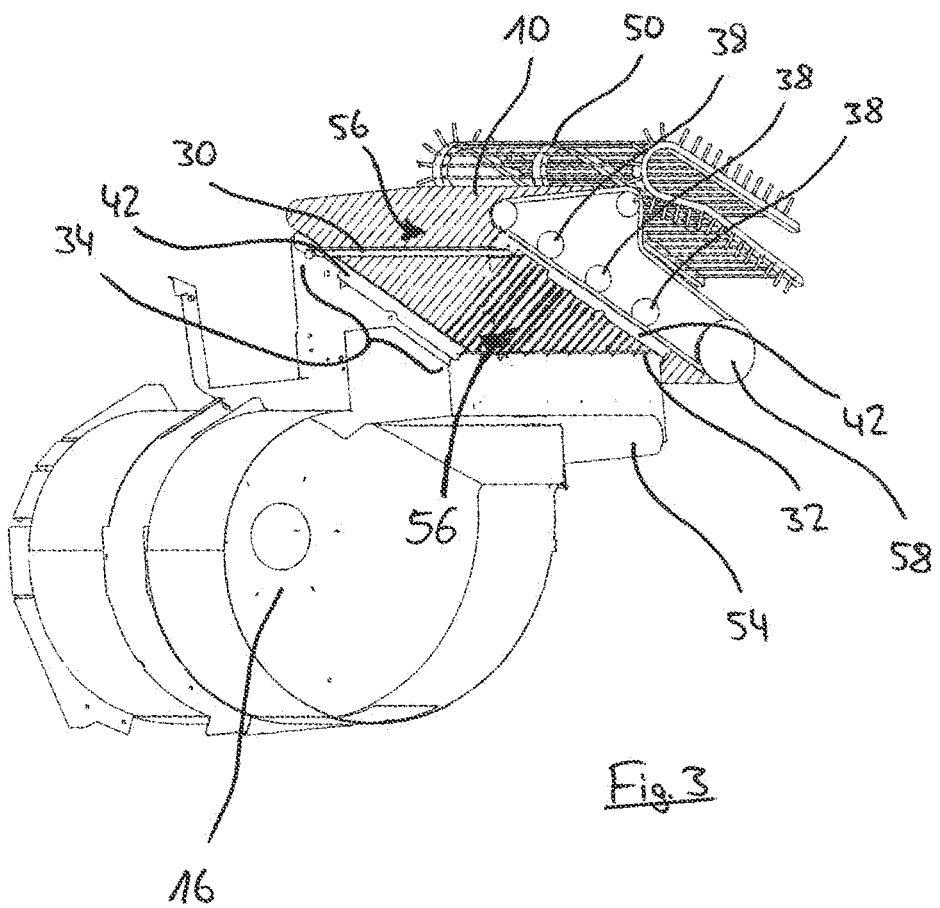
FIG. 3 shows an overview of the partly shown separating device according to FIG. 2.

FIG. 2, which shows a longitudinal section of the conveying device 2 only in part, also shows further guide elements 36 with sliding elements 42 which extend along the direction portion 24 in the fluid flow direction 22. These serve for guiding and positioning the conveyor belt portion 34 transversely to the fluid flow direction 22 (cf. FIG. 3), which realizes the directing portion 24. The directing portion 24 extends up to the separation region 12 and is separated therefrom solely by a wiper lip 30. FIG. 2 and FIG. 3 show that the directing portion 24 is realized by an outwardly directed conveyor side 56 of the fluid-impermeable conveyor belt, on which the harvested mixture 4 also rests in an upper region in operation. In a second region, the level directing portion 24 is realized by the conveyor side 56 and the fluid flow is delimited upward. The drive element 58 follows the conveyor belt portion 34 in the circulating direction of the conveyor belt 34.

FIG. 3 shows that the conveyor belt portion 34 rests on the sliding elements 42 over the entire length. The width of the directing portion 24, which is measured from one sliding element to the other sliding element, corresponds approximately to the overall width of the conveyor belt. The directing portion 24 is level and has a gradient of less than 60° relative to a horizontal.

Figure 4:
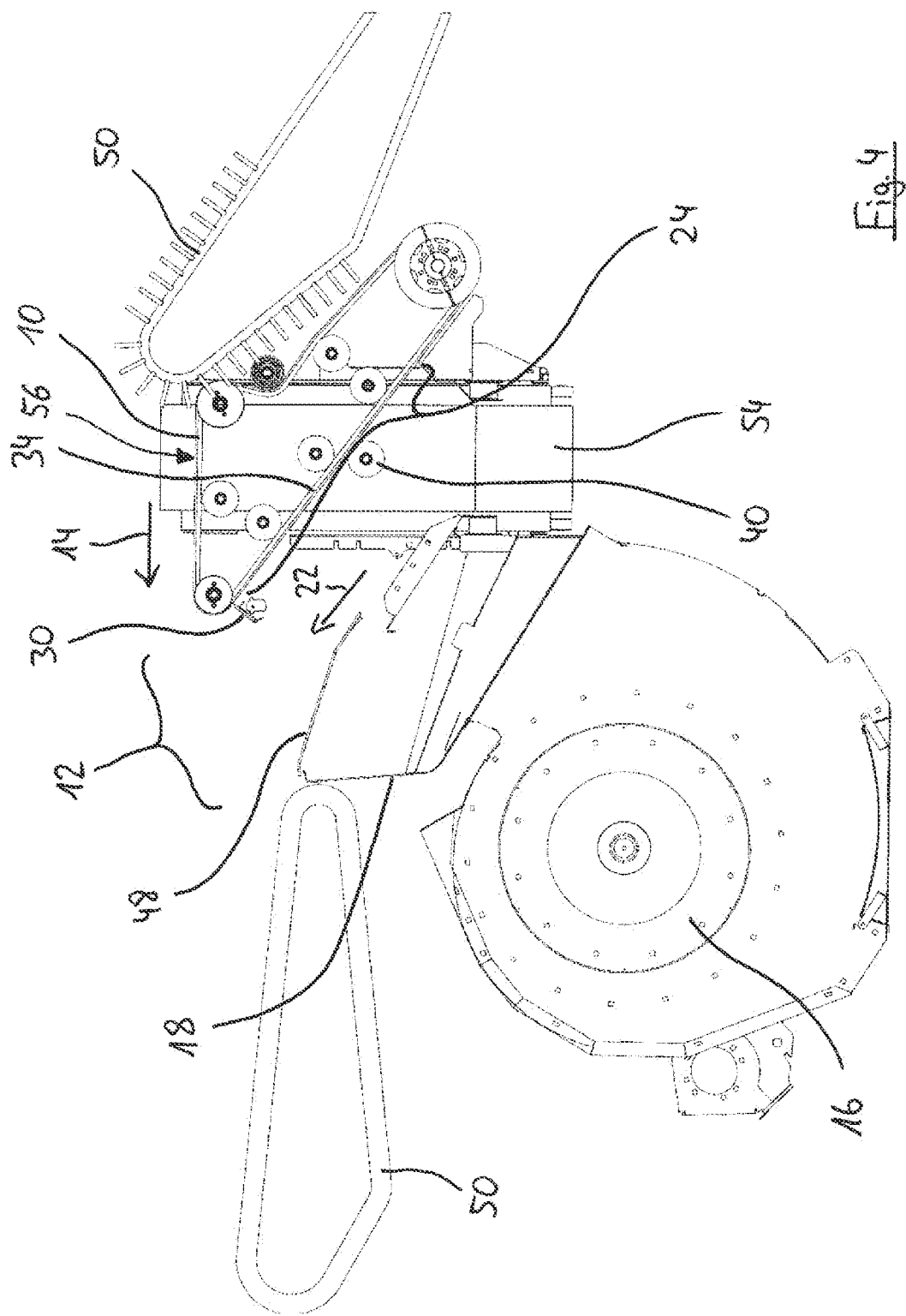
FIG. 4 shows a completely shown longitudinal section of a separating device according to the invention.
Figure 5:
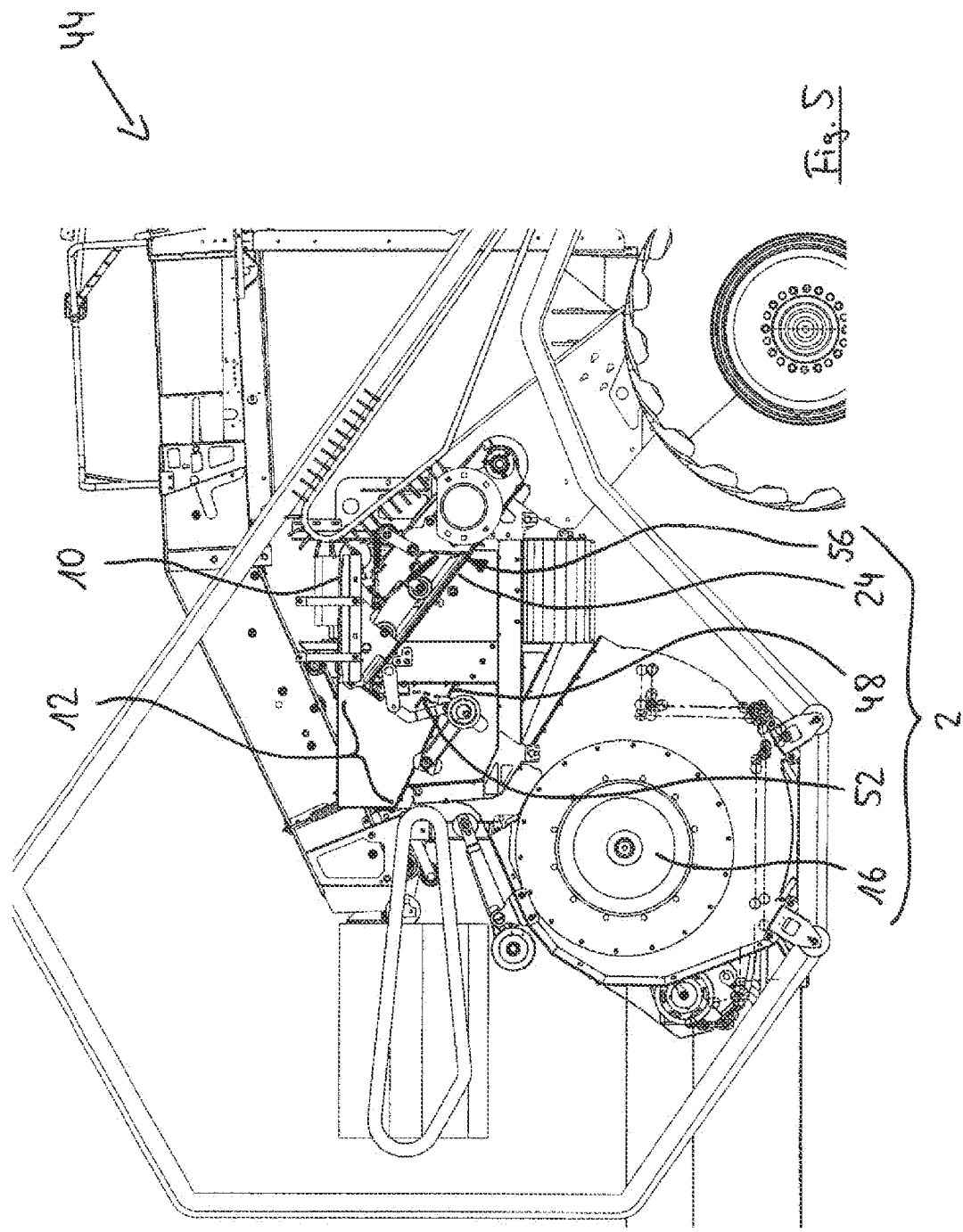
FIG. 5 shows a longitudinal section of part of a machine according to the invention with a separating device according to the invention.

Not shown in FIG. 2 and FIG. 3 are lateral side parts of the directing device 18 which are arranged in each case before and after the plane shown. Components, by means of which the potatoes 6 and the admixtures 8 are conveyed in and after the separation region 12 are not shown either FIG. 4 shows a longitudinal section of a conveying device 2, a stone removal device 54 also being shown. In particular stones which leave the separation region 12 and in particular the riddle grid 48 in a direction substantially opposite to the conveying direction 14, are removed transversely to the image plane by said stone removal device. A baffle plate is arranged between the riddle grid 48 and the stone removal device 54. As a result of the fluid flow and of a high-frequency movement of the riddle grid 48, the root crops 6 receive movement pulses, by means of which they move toward the hedgehog web 50 following in the conveying direction. On account of the greater density in particular of stones, they do not overcome the slight gradient of the riddle grid 48 and pass separating elements 52, which are indicated in FIG. 5, in an opposite direction. As a result of passing the separating elements 52, the stones move onto the fluid-impermeable baffle plate which directs them to the stone removal device 54.

FIG. 5 shows in a partly sectioned representation the rear part of a machine 44 according to the invention for harvesting root crops 6, in which the conveying device 2 according to the invention is arranged. As a result of the realization according to the invention, the installation height of the separating device can be reduced in the tightly occupied part of the machine. FIG. 6 shows the same machine 44 to be towed in an overall representation with a receiving device 46. FIG. 7 shows an alternative embodiment of the machine 44 according to the invention with a receiving device 46, once again, the conveying device 2 being arranged in the rear region of the harvesting machine 44. In said embodiment, the conveying element 10 conveys the harvested mixture 4 in a conveying direction 14 which is arranged at right angles to a further conveying direction of a further conveying element. The conveying direction 14, in this case, is arranged parallel to the driving direction of the harvesting machine. The further conveying element, to which the root crops 6 move after overcoming a drop step between the conveyor elements 10, is part of a cross elevator 60 which transports the root crops 6 transversely to the driving direction.

The invention claimed is:

1. A separating device for separating a harvested mixture of root crops and admixtures, the separating device comprising:
    at least one conveyor element for at least one of:
        supplying the harvested mixture to a separation region; and
        discharging the root crops from the separation region in a conveying direction;
    at least one fluid flow generator; and
    at least one directing device for directing a fluid flow in a fluid flow direction to the separation region;
    wherein:
        the directing device is realized in at least one directing portion by the conveyor element itself;
        the conveyor element is realized as a substantially fluid-impermeable conveyor belt; and
        the directing portion is realized by a conveyor side of the conveyor belt, and by a portion of the conveyor side which forms an upper boundary to delimits the fluid flow upward in a vertical direction.

2. The separating device according to claim 1, wherein the directing portion extends to the separation region.

3. The separating device according to claim 1, wherein the conveyor belt is realized as a slat conveyor with a plurality of conveyor belt slats which abut against one another in the conveying direction.

4. The separating device according to claim 1, wherein the directing portion has a length of at least 20 cm in the fluid flow direction.

5. The separating device according to claim 1, wherein the directing portion has a width orthogonal to the fluid flow direction of at least 80% of the width of the conveyor element.

6. The separating device according to claim 1, wherein the directing portion comprises at least in part a gradient of no more than 60° relative to a horizontal.

7. The separating device according to claim 1, further including at least one wiper lip which is stationary relative to the fluid flow generator, and which is arranged in a sealing manner on the conveyor element and preferably delimits the directing portion in the fluid flow direction.

8. The separating device according to claim 1, further including at least one sealing lip which seals the directing portion toward a further part of the directing device and is arranged in a stationary manner relative to the fluid flow generator and in a sealing manner on the conveyor element.

9. The separating device according to claim 1, further including at least one guide element which guides a conveyor belt portion which also realizes the directing portion.

10. The separating device according to claim 9, wherein at least one of multiple guide elements is realized as a pressing roller which is arranged at least on the side of the conveyor belt portion remote from the fluid flow.

11. The separating device according to claim 9, wherein at least one of the multiple guide elements is realized as a position roller which is arranged at least on the side of the conveyor belt portion facing the fluid flow.

12. The separating device according to claim 9, wherein at least one of the multiple guide elements is realized as a sliding element which abuts at least against the side of the conveyor belt portion facing the fluid flow and extends in the fluid flow direction.

13. A machine for harvesting or overloading root crops, comprising a receiving device and a separating device according to claim 1.

* * * * *